US011931670B2

(12) United States Patent
Traut et al.

(10) Patent No.: US 11,931,670 B2
(45) Date of Patent: *Mar. 19, 2024

(54) DRYER CARTRIDGE, DRYING SYSTEM, AND USE THEREOF

(71) Applicant: MANN+HUMMEL GmbH, Ludwigsburg (DE)

(72) Inventors: Alexander Traut, Bad Rodach (DE); Marius Panzer, Langenargen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 498 days.

This patent is subject to a terminal disclaimer.

(21) Appl. No.: 17/194,650

(22) Filed: Mar. 8, 2021

(65) Prior Publication Data

US 2021/0252425 A1 Aug. 19, 2021

Related U.S. Application Data

(63) Continuation of application No. PCT/EP2019/072001, filed on Aug. 16, 2019.

(30) Foreign Application Priority Data

Sep. 11, 2018 (DE) ..................... 10 2018 122 072.3

(51) Int. Cl.
*B01D 17/02* (2006.01)
*B01J 20/18* (2006.01)
(Continued)

(52) U.S. Cl.
CPC .......... *B01D 17/0202* (2013.01); *B01J 20/18* (2013.01); *F02M 25/0854* (2013.01);
(Continued)

(58) Field of Classification Search
CPC ............. B01D 17/0202; B01D 36/003; B01D 2253/10; B01D 2253/108; B01D 2257/80;
(Continued)

(56) References Cited

U.S. PATENT DOCUMENTS 2,365,149 A 12/1944 Anderson
4,478,619 A 10/1984 Arends et al.
(Continued)

FOREIGN PATENT DOCUMENTS

DE 102008034698 A1 * 6/2009 ........... B01D 53/261
DE 102012007762 A1 * 10/2013 ........... B01D 35/147
(Continued)

OTHER PUBLICATIONS

Abokhalaf et al, English machine translation, DE 102012007762 A1, pp. 1-9 (Year: 2012).*
(Continued)

*Primary Examiner* — Claire A Norris

(57) ABSTRACT

A dryer cartridge for removal of water from a liquid is provided with a cartridge body having a receiving chamber and a cartridge body wall delimiting the receiving chamber at least in sections thereof, wherein the cartridge body wall allows the liquid to flow through. A drying agent is arranged in the receiving chamber. A connection head is provided that can fasten the dryer cartridge in an opening of a housing wall of a device for receiving the liquid. The connection head has a connection opening and the connection opening connects in fluid communication the receiving chamber to an environment of the cartridge body. A drying system is provided with a device for receiving the liquid and with the dryer cartridge that can be fastened to an opening of a housing wall of a device for receiving the liquid.

20 Claims, 4 Drawing Sheets

(51) Int. Cl.
*F02M 25/08* (2006.01)
*F02M 37/24* (2019.01)
*B01J 20/28* (2006.01)

(52) U.S. Cl.
CPC ....... *F02M 37/24* (2019.01); *B01D 2253/108* (2013.01); *B01D 2257/80* (2013.01); *B01J 20/28085* (2013.01); *F02M 2025/0863* (2013.01)

(58) Field of Classification Search
CPC ............... B01J 20/28085; F02M 37/24; F02M 2025/0863
USPC ............................................ 210/DIG. 5, 689
See application file for complete search history.

(56) References Cited

U.S. PATENT DOCUMENTS

| | | | |
|---|---|---|---|
| 4,758,350 A * | 7/1988 | Pitts | B01D 17/0202 210/243 |
| 4,828,589 A | 5/1989 | Bauer | |
| 5,196,117 A | 3/1993 | Billiett et al. | |
| 2005/0235614 A1 | 10/2005 | Smith | |
| 2014/1099566 | 7/2014 | Gless | |

FOREIGN PATENT DOCUMENTS

| | | | | |
|---|---|---|---|---|
| EP | 0481239 | A1 | 4/1992 | |
| GB | 670250 | A | 4/1952 | |
| GB | 880537 | A | 10/1961 | |
| JP | 2008116133 | A * | 5/2008 | |
| WO | WO-2013174597 | A1 * | 11/2013 | ............. B01D 15/10 |

OTHER PUBLICATIONS

Kaseyama, English machine translation Jp 2008116133A, pp. 1-8 (Year: 2008).*
JP S61147104U, English machine translation, pp. 1 (Year: 1986).*
Meintschel et al, DE 102008034698, English machine translation, pp. 1-4 (Year: 2009).*
Bauer et al, English machine translation WO 2013-174597 A1, pp. 1-7 (Year: 2013).*

* cited by examiner

DRYER CARTRIDGE, DRYING SYSTEM, AND USE THEREOF

CROSS-REFERENCE TO RELATED APPLICATIONS

This application is a continuation application of international application No. PCT/EP2019/072001 having an international filing date of 16 Aug. 2019 and designating the United States, the international application claiming a priority date of 11 Sep. 2018 based on prior filed German patent application No. 10 2018 122 072.3, the entire contents of the aforesaid international application and the aforesaid German patent application being incorporated herein by reference.

TECHNICAL FIELD

The invention concerns a dryer cartridge for removal of water from a fluid, in particular oil, with a cartridge body that forms a receiving chamber in which a drying agent is received, wherein the receiving chamber, at least in sections thereof, is delimited by a wall of the cartridge body through which the fluid can flow. Moreover, the invention concerns a drying system with such a dryer cartridge and its use.

BACKGROUND

In fluid-conducting systems, it may happen that water collects in the fluid due to various processes. The water can reach the system, for example, by air exchange with the environment and collect in the fluid. Likewise, free water can be introduced into the system from the environment. The water can be present in the fluid as free or dissolved water. The water in the fluid can cause undesirable effects such as, for example, corrosion of fluid-conducting components of the system, an increase or decrease of the electrical conductivity of the fluid and/or reduction of the service life of the fluid, i.e., a shortening of service intervals. At low temperatures, ice crystals may form that block the system.

U.S. Pat. No. 4,861,469 A discloses a dewatering device for a fuel tank that is introduced into the tank and removed from the tank through the tank opening. The device comprises an elongated cylindrical container. A small portion of the container volume is filled with a hygroscopic material. The container is held at an elongate strap which is fastened close to the tank opening so that it is accessible. The length of the strap is selected to be so large that the container sinks to the bottom of the tank in order to absorb water that is present thereat. This device is therefore only suitable to absorb free water that has collected at the bottom of the tank.

SUMMARY OF THE INVENTION

It is object of the invention to provide a device that enables a reliable removal of water, in particular of dissolved water, from a fluid. Furthermore, it is object of the invention to provide a use of a device for reliable removal of water, in particular dissolved water, from a fluid.

These objects are solved by a dryer cartridge for removal of water from a liquid, in particular oil, with a cartridge body that forms a receiving chamber in which a drying agent is received, wherein the receiving chamber, at least in sections thereof, is delimited by a wall of the cartridge body through which the liquid can flow, and with a connection head for, preferably releasable, fastening of the dryer cartridge in an opening of a housing wall of a device for receiving the liquid, wherein the connection head comprises a connection opening which connects in fluid communication the receiving chamber to an environment.

These objects are further solved by a drying system for removal of water from a liquid, in particular oil, comprising a device for receiving the fluid, and a dryer cartridge according to the invention.

These objects are further solved by use of a dryer cartridge according to the invention or of a drying system according to the invention for drying a liquid, wherein the liquid flows through the connection opening.

Preferred embodiments are disclosed in the dependent claims and the description.

The dryer cartridge according to the invention serves for removal of water from a liquid fluid. The fluid can be in particular oil, for example, lubricant oil, cooling oil, and/or insulating oil. As an alternative or in addition thereto, the fluid can comprise dialcohol. The fluid can be moreover a cooling agent, for example, halogenated or non-halogenated hydrocarbons, in particular hydrofluorocarbon or hydrofluoroether. The dryer cartridge comprises a cartridge body. The cartridge body forms a receiving chamber in which a drying agent is received. In use, the drying agent can remove water from the fluid and retain it inside the receiving chamber. The receiving chamber, at least in sections thereof, is delimited by a wall of the cartridge body through which the fluid can flow. Preferably, the wall of the receiving chamber is configured to be flowed through by the fluid about the entire circumference. In use, the fluid with the water contained therein can flow into the receiving chamber or flow out of the receiving chamber through the wall that can be flowed through. Preferably, the liquid flows about the entire circumference radially into the receiving chamber and axially out of it, or vice versa, i.e., axially in and radially out. In use of the device, the fluid contacts the drying agent in the receiving chamber. The drying agent can remove water from the fluid and permanently retain it. The dryer cartridge comprises a connection head for fastening, for example, releasably, the dryer cartridge in an opening of a housing wall of a device for receiving the fluid. For this purpose, the connection head can comprise a thread. Typically, at the connection head a sealing element is arranged, in particular wherein the sealing element comprises an O-ring, a shaped seal and/or a flat seal. The sealing element can comprise alternatively or additionally a sealing lip. The sealing element can be designed as a two-component seal. Typically, the sealing element is held at the connection head by form fit, for example, in a groove, so that it can be exchanged together with the dryer cartridge. Alternatively, the sealing element can be injection molded to the connection head. The sealing element serves for sealing the connection head relative to the housing wall surrounding the opening.

The connection head comprises a connection opening which connects in fluid communication the receiving chamber to an environment. Through the connection opening, the fluid can flow into the receiving chamber or out of the receiving chamber. When the fluid flows through the connection opening in the connection head, it flows mandatorily also through the receiving chamber and contacts here the drying agent. In this way, a reliable drying of the fluid is achieved. In this way, water that is dissolved in the fluid is unavoidably brought into contact with the drying agent so that the drying agent can remove the water from the fluid. The dryer cartridge according to the invention does not rely on the water contained in the fluid accidentally reaching the drying agent but makes it possible to guide the water-containing fluid in a targeted fashion across the drying agent. In this way, a fast drying of the fluid can be achieved. In operation of the dryer cartridge, typically a fluid conduit is connected to the connection opening.

The wording "removal of water from the fluid" and "drying of the fluid" are used synonymously in the context of the present invention. The fluid to be dried is typically a liquid that also in the "dry" state, i.e., free of water, is present in the liquid aggregation state.

Preferably, the receiving chamber is at least in sections thereof surrounded by a filter medium. The filter medium enables retention of particulate contaminants that may be contained in the fluid. By arranging the filter medium about the receiving chamber that can be flowed through by forced flow, the dryer cartridge comprises an added filter function. In many application, a separate filter element for the fluid can therefore be dispensed with. The fluid is thus freed from water as well as particulate contaminants by flowing through the dryer cartridge provided with the filter medium.

The filter medium can be reinforced by a support structure (drainage grid) of metal or plastic material. In this way, the stability is increased and, as needed, the support structure at the same time can take on the retaining function of a molecular sieve. In this case, the support body as well as possibly present screens can be dispensed with.

The filter medium can be arranged so as to adjoin directly or indirectly the receiving chamber. The filter medium can surround the receiving chamber completely and can extend in particular from the connection head to a free end of the cartridge body. This reduces the flow resistance of the dryer cartridge. Alternatively, the filter medium can surround the receiving chamber only partially and in particular can be arranged at a distance from the connection head at the cartridge body. The section of the wall of the receiving chamber between the filter medium and the connection head can be designed not to be flowed through. In this way, a longer contact of the fluid with the drying agent can be provided for a stronger drying action; for this purpose, the receiving chamber can be typically filled completely or substantially completely with the drying agent. This configuration is suitable in particular for applications in which the cartridge body is immersed only partially in the fluid.

The drying agent can comprise an adsorber material. Advantageously, the drying agent can comprise a porous crystalline structure, in particular a molecular sieve, preferably a zeolite molecular sieve. The molecular sieves comprise typically a mesh width (pore size) of 3 to 4 angstrom so that water molecules can be reliably adsorbed at the inner surface. The drying agent can comprise various types of zeolite molecular sieves. The drying agent can comprise natural or synthetic zeolites. Silica gel can be present in the form of alumino silicate. The drying agent can comprise bentonite/clay minerals, for example, containing aluminum oxide, calcium sulfate, calcium carbonate; the aforementioned drying agents can be regenerated. Also, the drying agent can comprise bentonite/clay minerals that cannot be regenerated, for example, containing calcium, calcium hydride, calcium oxide, calcium sulfate, potassium hydroxide, copper sulfate, lithium aluminum hydride and/or sodium hydroxide.

Molecular sieves are advantageously used at low concentrations of dissolved water in the fluid. Silica gels are suitable in particular for drying air and fluids with high concentrations of dissolved water. The silica gels can comprise an average pore size of 25 nm or 65 nm. Silica gels can indicate an exhaustion of the water absorption capacity by color change. For this purpose, cobalt chlorite and/or methyl violet (orange gel) can be used as color indicator, for example. The adsorber material can comprise a framework silicate.

The drying agent, in particular in the form of zeolite molecular sieves, can be present as a powder, for example, with an average particle size of 5 µm to 10 µm (pure form of zeolite). Alternatively or additionally, the drying agent, in particular in the form of zeolite molecular sieves, can be present in a bead shape (e.g., 0.1 mm to 50 mm in diameter), in rod shape, as hollow fiber membrane, as mixture of polymer and drying agent (e.g., polypropylene Tropack™), as moldings, as solid body and/or as shaped body (in particular of composite material), preferably with a sponge or honeycomb structure.

The dryer cartridge can be manufactured at least partially from a composite material on the basis of polymer, which contains drying agent (e.g., zeolite) as well as channel formers for producing mesopores in the polymer material.

The drying agent can comprise two different drying agent components. The different drying agent components differ in their properties. Preferably, one of the drying agent components comprises an adsorber material for adsorption of water from air, e.g., a silica gel, and the other drying agent component a molecular sieve for adsorption of water from a liquid, e.g., a zeolite molecular sieve. In particular, the two drying agent components can be arranged so as to be separated spatially from each other in the receiving chamber. In this way, it can be advantageously provided that one of the drying agent components, preferably containing a molecular sieve, is immersed in the liquid fluid to be dried while the other drying agent component, preferably containing a silica gel, is arranged in a head space above the fluid.

The filter medium can be embodied as a sole wall. The wall through which the fluid can flow can comprise a screen, a spunbond material, and/or a nonwoven.

These components, as needed, can be provided in addition to a filter medium that surrounds the receiving chamber. The aforementioned materials allow the fluid to pass (flow through). At the same time, they are suitable for retaining the drying agent in the receiving chamber, in particular also for retaining abraded particles or fragments of the drying agent. In this context, typically a material with larger pores than for filtering particulate contaminants from the fluid is sufficient. A mesh width of the aforementioned materials can amount to at least 1 µm and/or at most 5,000 µm. A separation of retaining and filtering function can be preferred also for manufacture-technological reasons. Preferably, the wall is formed with synthetic materials.

The drying agent can be arranged in a drying agent bag which is received in the receiving chamber. This simplifies the introduction of the drying agent into the receiving chamber. The fluid can flow through the material of the drying agent bag. When the receiving chamber is designed to be openable in a reclosable manner, the drying agent can be exchanged in a simple way so that the dryer cartridge can be furthermore reused.

The invention also encompasses a drying system for removal of water from the fluid. The fluid can be in particular oil, for example, cooling oil and/or insulating oil, or a cooling agent. The drying system comprises a device for receiving the fluid. The drying system moreover comprises a dryer cartridge as described above. With the drying system according to the invention, the advantages of the dryer cartridge according to the invention can be utilized.

The cartridge body can be fixed relative to the housing wall by fastening the connection head in the opening of the housing wall. In this way, it can be ensured that the receiving chamber with the drying agent is always located in a predefined position inside the device for receiving the fluid. In this way, it can also be avoided that the position of the cartridge body changes during the use of the drying system. Accordingly, it can be achieved that the receiving chamber with the drying agent is always located in a position suitable for drying the fluid. Moreover, it is avoided that the cartridge body damages components of the device for receiving the fluid because it cannot move dynamically inside the device. The cartridge body can be completely fixed relative to the housing wall. The cartridge body or the entire dryer cartridge can be rigidly embodied. The dryer cartridge can be integrated advantageously into an existing device for receiving the fluid in order to obtain thus a drying system according to the invention without requiring greater modifications at the device for receiving the fluid. In particular, due to the fixation of the cartridge body at the wall there is no danger that it comes into contact with other components of the device for receiving the fluid. In addition, it can be ensured that the drying agent always has sufficient contact with the fluid.

In the drying system, a bypass for bypassing the dryer cartridge or the receiving chamber for the fluid can be provided. The bypass forms a flow path bypassing the receiving chamber. The flow path that is made available by the bypass can extend through the connection opening. The bypass is typically designed to open the flow path bypassing the receiving chamber when a permissible differential pressure is surpassed. This can be the case when the fluid comprises a higher viscosity at low temperatures and/or when the flow resistance of the receiving chamber increases, for example, when a filter medium arranged about the receiving chamber is clogged or when the water absorption capacity of the drying agent is exhausted. The bypass is preferably provided at the dryer cartridge between the connection head and the receiving chamber with the drying agent. The bypass can be designed as a valve. Alternatively or additionally, the bypass may comprise flow openings.

Preferably, the device for receiving the fluid contains the fluid. Thus, this is referred to also as fluid-containing device.

The drying agent of the dryer cartridge can be immersed partially in the fluid and partially arranged in a head space above the fluid. In this way, the air above the fluid can be dried (dehumidified) and the fluid itself can be dried at the same time. For this purpose, the dryer cartridge preferably comprises two different drying agent components that are arranged, particularly preferred, spatially separated from each other in the receiving chamber. Typically, the receiving chamber is immersed to about two thirds in the fluid.

The fluid can be an electrically nonconducting insulating oil and/or cooling oil. In particular, the insulating oil can contain a polyol ester oil and/or a poly-alpha-olefin. In case of insulating oils, a removal of the dissolved or free water is particularly important in order to maintain the insulating properties of the insulating oil. Insulating oils are used, for example, in electrical devices such as transformers, capacitors, and/or batteries/rechargeable batteries. The insulating oil can act at the same time as a cooling oil for heat dissipation.

The fluid can contain a dialcohol. The fluid can furthermore be a cooling agent, for example, containing halogenated or non-halogenated hydrocarbons, in particular a hydrofluorocarbon, or hydrofluoroether.

The dryer cartridge can be fixed in a compensation tank of the device for receiving the fluid. The compensation tank serves in particular for compensation of heat-caused volume changes and/or of fluctuations of the volume of the fluid contained in the device. Typically, the fluid is supplied in operation from the compensation tank to a further component of the device for receiving the fluid and then returned to the compensation tank. In the compensation tank, the dryer cartridge reliably contacts the fluid to be dried. In addition, the compensation tank can be adapted for accommodating the dryer cartridge without this having effects on further components of the device for receiving the fluid.

The dryer cartridge can be fastened in an opening of a housing wall of the device for receiving the fluid, preferably in a releasable manner. The attachment can be by form fit. Preferably, the form fit prevents a pure translation of the dryer cartridge relative to the housing wall in any spatial direction. Typically, the cartridge body in the fixed state is not movable—neither by translation nor rotation—relative to the housing wall. Preferably, the dryer cartridge is screwed into the opening of the housing wall. In this way, the dryer cartridge can be fixed safely at the housing wall. In addition, the attachment and optionally exchange of the dryer cartridge can be realized quickly and easily. Alternatively or additionally, the dryer cartridge can be fastened by a bayonet connection in the opening and/or can be clipped into the opening and/or snapped into the opening and/or can be fastened by means of a pushed-on clip in the opening. This can further accelerate fastening or exchange of the dryer cartridge and/or additionally secure the attachment.

The device for receiving the fluid can be an internal combustion engine, an electric motor, a transmission and/or a braking system. The device for receiving the fluid can comprise a fuel cell, battery, a transformer, or a rechargeable battery. Furthermore, the device for receiving the fluid can comprise power electronics. In these devices, drying of the fluid in the device is particularly important. The aforementioned devices can be, for example, a part of a motor vehicle or can be designed otherwise to be mobile. The device for receiving the fluid can comprise a buffer battery that can serve, for example, for intermediate storage of regeneratively generated electrical energy and its supply into a power network. The fluid is typically a cooling liquid, in particular a cooling oil, or a cooling agent. The fluid can exhibit at the same time electrically insulating properties of an insulating oil.

The drying system can comprise a moisture sensor, in particular a capacitive moisture sensor. The latter can measure the moisture (the water content) of the fluid. In this way, it can be detected when the water absorption ability (water absorption capacity) of the drying agent is exhausted and a satisfactory drying of the fluid no longer occurs. Alternatively or additionally, the drying system can comprise an inspection glass in which a color change takes place when the water content of the fluid surpasses a limit value.

The dryer cartridge can be part of a thermal management module. The module comprises: a container, in particular a compensation container, for receiving the liquid, wherein the dryer cartridge, projecting into the container, is fixed thereat; at least one filter or a screen; a pump; at least one sensor for determining at least one process parameter, for example, temperature and/or moisture and/or pressure; and a cooling device. The module can be a part of one of the above-described devices for receiving the fluid.

The present invention also encompasses a use of an above-described dryer cartridge according to the invention or of an above-described drying system according to the invention for drying a fluid, wherein the fluid flows through the connection opening. In this way, it is achieved that the fluid also flows into the receiving chamber with the drying agent. In the receiving chamber, the fluid contacts the drying agent so that water contained in the fluid is removed at least partially by the drying agent from the fluid and is retained. After the fluid exits from the dryer cartridge, dried fluid with a reduced water proportion is thus available. Since the fluid flows through the connection opening, it is ensured that the fluid is dried in the described manner.

BRIEF DESCRIPTION OF THE DRAWINGS

Further features and advantages of the invention result from the following detailed description of embodiments of the invention, from the claims as well as based on the Figures of the drawing showing details according to the invention. The aforementioned and still to be described features can be realized individually on their own or several combined in any combinations in variants of the invention. The features disclosed in the drawing are illustrated such that the particularities according to the invention can be made clearly visible.

DESCRIPTION OF PREFERRED EMBODIMENTS

Figure 1:
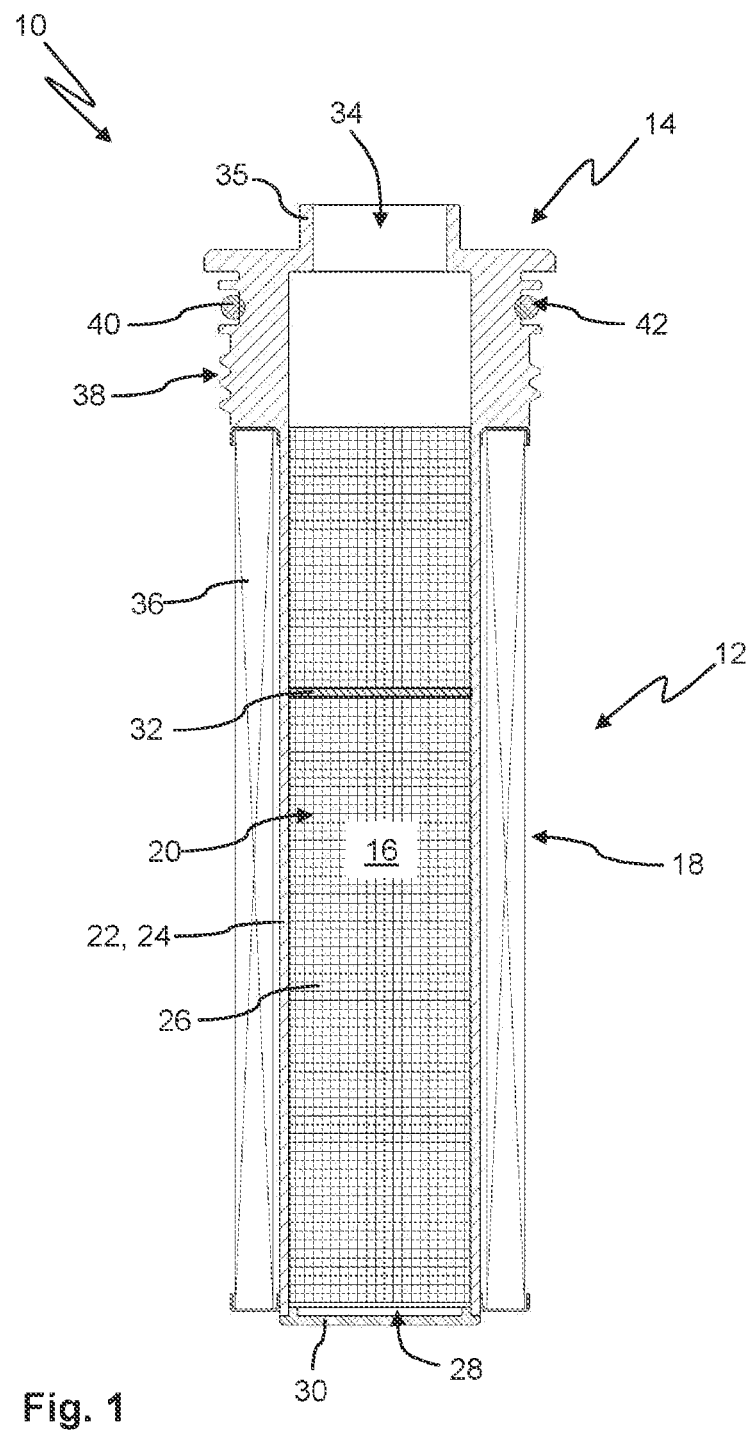
FIG. 1 shows a dryer cartridge with a connector with a connection opening and a receiving chamber for drying agent surrounded by a filter medium, in a schematic longitudinal section.

FIG. 1 shows a dryer cartridge 10 in a schematic longitudinal section. The dryer cartridge 10 comprises a cartridge body 12 and a connection head 14.

The cartridge body 12 comprises a receiving chamber 16. The receiving chamber 16 is surrounded by a cartridge body wall 18 through which the liquid can flow. The flow-through wall 18 is formed here by a screen 20. The screen 20 can be embodied as one piece together with the cartridge body 12. Presently, the screen 20 is designed as a component separate from the cartridge body 12 and is inserted into the cartridge body 12. The screen 20 is of a closed configuration in circumferential direction as well as at the end faces at both sides. The screen 20 is supported, here from the interior, by a grid-type support structure 22 of the dryer cartridge 10. In FIG. 1, longitudinally extending longitudinal stays 24 of the grid-type support structure 22 can be seen; transverse stays extending in circumferential direction about the receiving chamber 16 and connecting the longitudinal stays 24 to each other cannot be seen in the present view. The screen 20 can have pores (meshes 26) with a pore size (mesh width) of approximately 50 µm.

The cartridge body 12 comprises at a bottom end a fill opening 28. After insertion of the screen 20 and filling the drying agent into the receiving chamber 16, the fill opening 28 is closed off by a cover part 30. The cover part 30 is glued here to the cartridge body 12. Alternatively or additionally, the cover part 30 can also be clipped, screwed and/or welded to the cartridge body 12.

In the receiving chamber 16, the drying agent (not illustrated in detail) is received. The drying agent comprises here two different drying agent components, namely a silica gel and a zeolite molecular sieve. The two drying agent components are arranged spatially separated from each other in the receiving chamber 16. For this purpose, a separation element 32 can divide the receiving chamber 16, preferably transversely to its longitudinal direction. Closer to the connection head 14, the silica gel is arranged in the receiving chamber 16. Facing away from the connection head 14, i.e., here closer to the cover part 30, the zeolite molecular sieve is arranged.

In an alternative embodiment of the dryer cartridge 10, not illustrated here in detail, the drying agent can be received in one or a plurality of drying agent bags which, in turn, are arranged in the receiving chamber 16. The drying agent bag or bags can be provided instead of or in addition to the screen 20. A first drying agent bag can contain a first drying agent component and a second drying agent bag can contain a second drying agent component. When using drying agent bags, a separation element in the receiving chamber 16 for spatial separation of the drying agent components can be dispensed with.

In the receiving chamber 16, an elastic element, for example, a spring can be arranged which generates a pretension so that the drying agent during operation is substantially arranged immobile in the dryer cartridge 10. For example, the elastic element is arranged between cover part 30 and drying agent or between drying agent and connection head 14. By means of the elastic element, abrasion of the drying agent is avoided, in particular in the case that the drying agent is present in the form of beads, because a relative movement of the beads is prevented or at least reduced.

The connection head 14 of the dryer cartridge 10 comprises a connection opening 34. The connection opening 34 opens a connection for fluid communication of an environment of the dryer cartridge 10, i.e., a region outside thereof, here in particular above it, to the receiving chamber 16. Due to the connection opening 34, the fluid can be introduced into the receiving chamber 16 or—in reverse flow direction—discharged from the receiving chamber 16. In principle, the fluid flows through the connection opening 34 upon use of the dryer cartridge 10. The dryer cartridge 10 is thus operated with active flow through it. Alternatively, it is however conceivable to operate the dryer cartridge 10 with passive flow through it, i.e., not passing the fluid through the connection opening 34. The connection opening 34 could be closed for this purpose by a plug. The fluid would then flow exclusively through the flow-through wall 18 into the receiving chamber 16 and out of the receiving chamber 16. Preferred is however the afore described active flow through the dryer cartridge 10 with fluid flow through the connection opening 34. In this way, it can be ensured that the fluid contacts the drying agent in the receiving chamber 16.

The connection opening 34 is here provided with a collar 35 at which a fluid conduit (not illustrated) can be fastened. As an alternative or in addition to the collar 35, at the connection opening a threaded section (not illustrated) can be embodied for connecting a fluid conduit.

The flow-through wall 18 of the receiving chamber 16 comprises here a filter medium 36 in addition to the screen 20. The filter medium 36 is arranged in a ring shape about the receiving chamber 16 at the cartridge body 12. The filter medium 36 contacts externally the grid-shaped support structure 22 of the cartridge body 12. The filter medium 36 enables filtering particulate contaminants out of the fluid. The screen 20 serves, on the other hand, primarily for retaining the drying agent and possible fragments or abraded particles thereof in the receiving chamber 16. A pore size of the filter medium 36 is typically significantly smaller than a pore size (mesh width) of the screen 20. Here, the pore size of the filter medium 30 amounts to 10 µm. The filter medium 36 can be embodied wound or folded. The filter medium 36 can be glued to the cartridge body 12 or overmolded by it. The filter medium 36 can be connected with form fit, material fusion and/or friction fit to the cartridge body 12. Due to the grid-shaped support structure 22, a radial distance between the filter medium 36 and the screen 20 is provided. The resulting gap between the filter medium 36 and the screen 20 can effect a differential pressure reduction. In addition, through the gap a drainage or a flow path for bypassing the filter medium 36 can be provided. Optionally, the support structure 22 and the screen 20 can be dispensed with and only the filter medium 36 can provide the retaining function.

The connection head 14 is provided here with an outer thread 38. Above the outer thread 38 a sealing element 40, here an O-ring, can be arranged at the connection head 14. For receiving the sealing element 40, the connection head 14 comprises a groove 42 in which the sealing element 40 is held.

Figure 2:
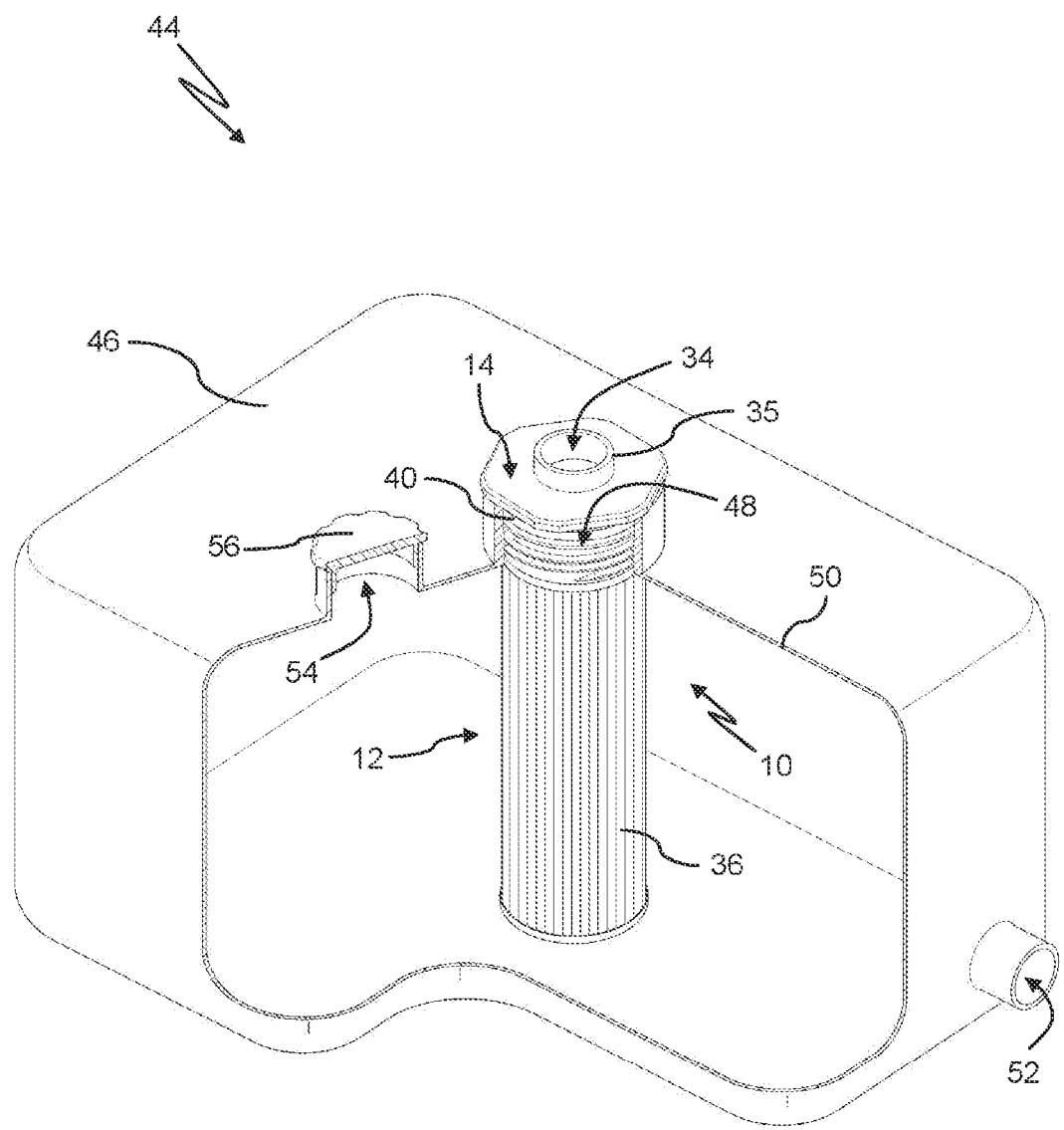
FIG. 2 shows the dryer cartridge of FIG. 1 screwed into an opening of a housing wall of a compensation tank, in a schematic perspective view with partially sectioned compensation tank.

FIG. 2 shows a drying system 44 with the dryer cartridge 10 of FIG. 1. The drying system 44 comprises moreover a device for receiving the fluid which comprises here a compensation tank 46. The dryer cartridge 10 is fastened in an opening 48 in a housing wall 50 of the compensation tank 46 of the device for receiving the fluid. Here, the dryer cartridge 10 is screwed with the outer thread 38 into the opening 48. Due to being screwed into the opening 48, the dryer cartridge 10 is fastened with form fit at the housing wall 50 of the compensation tank 46. For sealing, the sealing element 40 is arranged between the connection head 14 and the housing wall 50 surrounding the opening 48.

By attachment of the connection head 14 at the housing wall 50, the cartridge body 14 is fixed relative to the housing wall 50. The cartridge body 14 in the fastened state cannot move relative to the compensation tank 46. The dryer cartridge 10 with the cartridge body 12 and the connection head 14 is designed here as a whole as a rigid component. By screwing the connection head 14 into the opening 48 of the housing wall 50, in particular a pure translation of the cartridge body 12 relative to the housing wall 50 is prevented. The only possible movement of the dryer cartridge 10 relative to the compensation tank 46 is here a screwing movement (combined translation and rotation that is coupled by the thread pitch of the outer thread 38). Without releasing the attachment of the connection head 14 at the housing wall 50, the cartridge body 12 is typically (thus also here) not movable—neither by translation nor rotation—relative to the housing wall 50.

Alternative embodiments of the drying system 44 and of the dryer cartridge 10 are conceivable in which the cartridge body 12 in the fastened state of the connection head 14 is rotatable, for example, about a longitudinal axis of the cartridge body 12 without the (translatory) position of the cartridge body 12 changing otherwise. In this context, the connection head 14 can be designed, for example, with a round cross section and by means of a pushed-on clip can be fixedly clipped at the opening 48 (not illustrated).

The drying system 44 comprises here in addition to the compensation tank 46 and the dryer cartridge 10 an electrical device, namely a rechargeable battery (not illustrated). The rechargeable battery serves as a buffer battery for intermediate storage of regeneratively produced electrical energy and its supply into a power network, for example, of an residential building.

When using the dryer cartridge 10 in the drying system 44, the fluid, not illustrated in detail, is located in the compensation tank 46. Here, the fluid is an electrically nonconducting insulating oil which is used for cooling the electrical device, i.e., here the rechargeable battery. The fluid flows through the connection opening 34 of the dryer cartridge 10 into the compensation tank 12. In this context, the fluid flows through the drying agent arranged in the receiving chamber 16 and the filter medium 36. Through an outlet 52 of the compensation tank 46, the fluid is supplied again to the electrical device. A reverse direction of flow is also conceivable. For this purpose, the drying agent cartridge 10 can be fastened in a way not illustrated in detail in a bottom-side opening in the housing wall 50, for example, in the outlet 52 (which, accordingly, is to be dimensioned and provided with an inner thread).

The compensation tank 46 comprises here moreover an auxiliary opening 54. The auxiliary opening 54 is closed by a plug 56. Via the auxiliary opening 54, fluid can be refilled into the compensation tank 46, for example. For this purpose, the plug 56 is removed.

Figure 3:
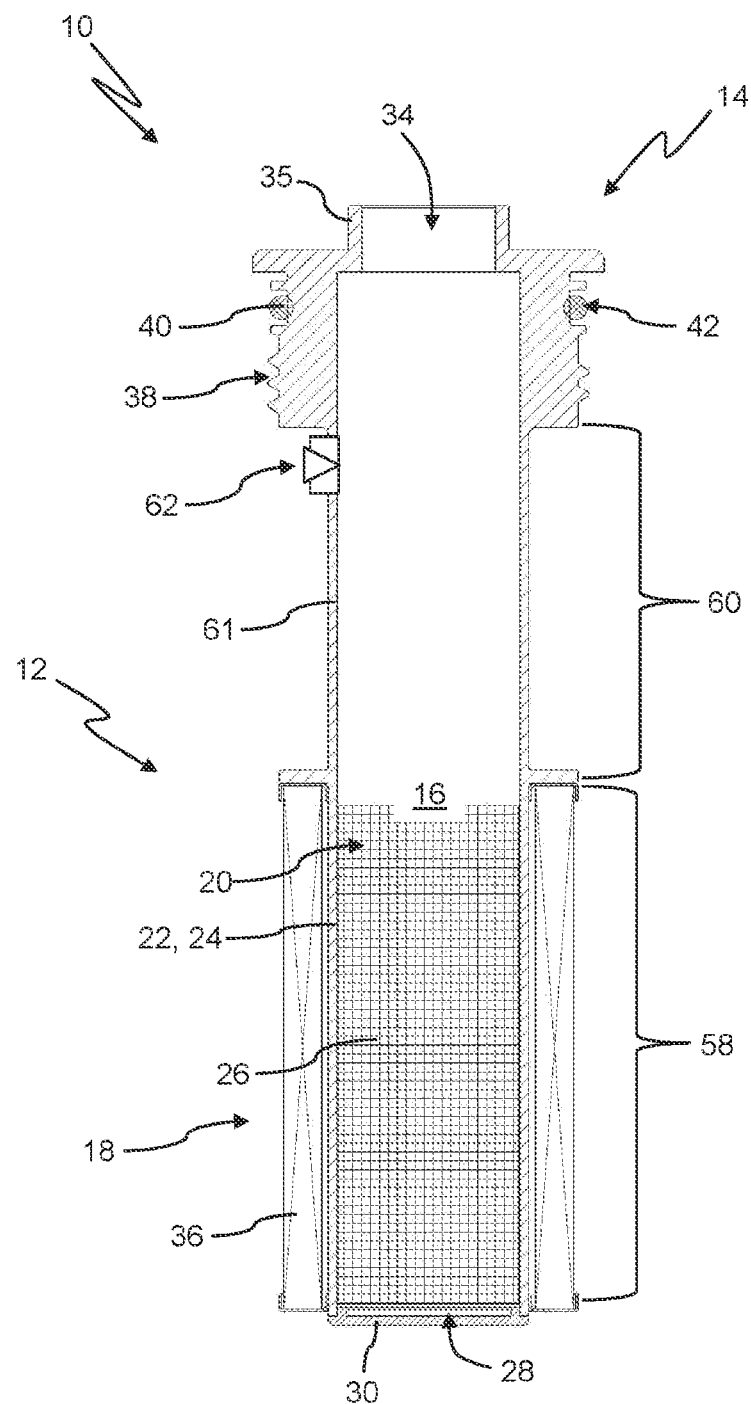
FIG. 3 shows a dryer cartridge with a receiving space for drying agent which, in a region facing away from a connection head, is delimited by a wall that can be flowed through and by a filter medium, in a schematic longitudinal section.

FIG. 3 shows a further embodiment of a dryer cartridge 10. In regard to its essential components and the basic configuration as well as the basic functions, the dryer cartridge 10 of FIG. 3 corresponds to the dryer cartridge 10 of FIG. 1. In the following, primarily the differences will be explained.

The wall 18 of the cartridge body 12 can be flowed through only in a region 58 which is arranged spaced apart from the connection head 14. Between the flow-through region 58 of the wall 18 and the connection head 14, a wall section 60 is provided which cannot be flowed through. The wall section 60 which cannot be flowed through forms shaft 61 of the cartridge body 12. The screen 20 and the filter medium 36 are arranged only in the flow-through region 58 of the wall 18.

The receiving chamber 16 extends also in the dryer cartridge 10 of FIG. 3 from the cover part 30 to the connection head 14. The receiving chamber 16 can be filled with drying agent past the flow-through region 58 of the wall 18, i.e., also in the region of the wall section 60 that cannot be flowed through. Here, the receiving chamber 16 is completely filled with the drying agent. Alternatively, the receiving chamber can be filled only in the flow-through region 58 of the wall 18 with the drying agent. The shaft 61 which cannot be flowed through serves then primarily as a spacer for positioning the drying agent at some distance from the connection head 14.

The dryer cartridge 10 of FIG. 3 comprises a bypass 62. The bypass 62 is designed here as a valve that opens upon surpassing a permissible pressure difference. The bypass 62 is arranged at the shaft 61, here near the connection head 14. When the permissible pressure difference is surpassed, for example, in case of very cold fluid and/or clogged filter medium 36 and/or exhausted water absorption capacity of the drying agent, the fluid can flow from the connection opening along a short path out of the receiving chamber 16 again. When the bypass 62 is open, the fluid must not flow through the drying agent and optionally the filter medium 36. The bypass 62 can be designed correspondingly also for a reverse flow direction through the dryer cartridge 10.

As an alternative to the configuration as a valve, the bypass 62 can be designed as a perforation in the shaft 61 of the cartridge body 12. Such a perforation is typically provided near the connection head 14. In normal operation, the greatest portion of the fluid flows past the perforations of such a bypass 62. When the flow resistance of the dryer cartridge 10 increases, the fluid is backed up increasingly in the receiving chamber 16 until its level reaches the perforation of the bypass 62. Here, a portion of the fluid then flows out of the dryer cartridge 10, bypassing at least mostly the receiving chamber 16.

Figure 4:
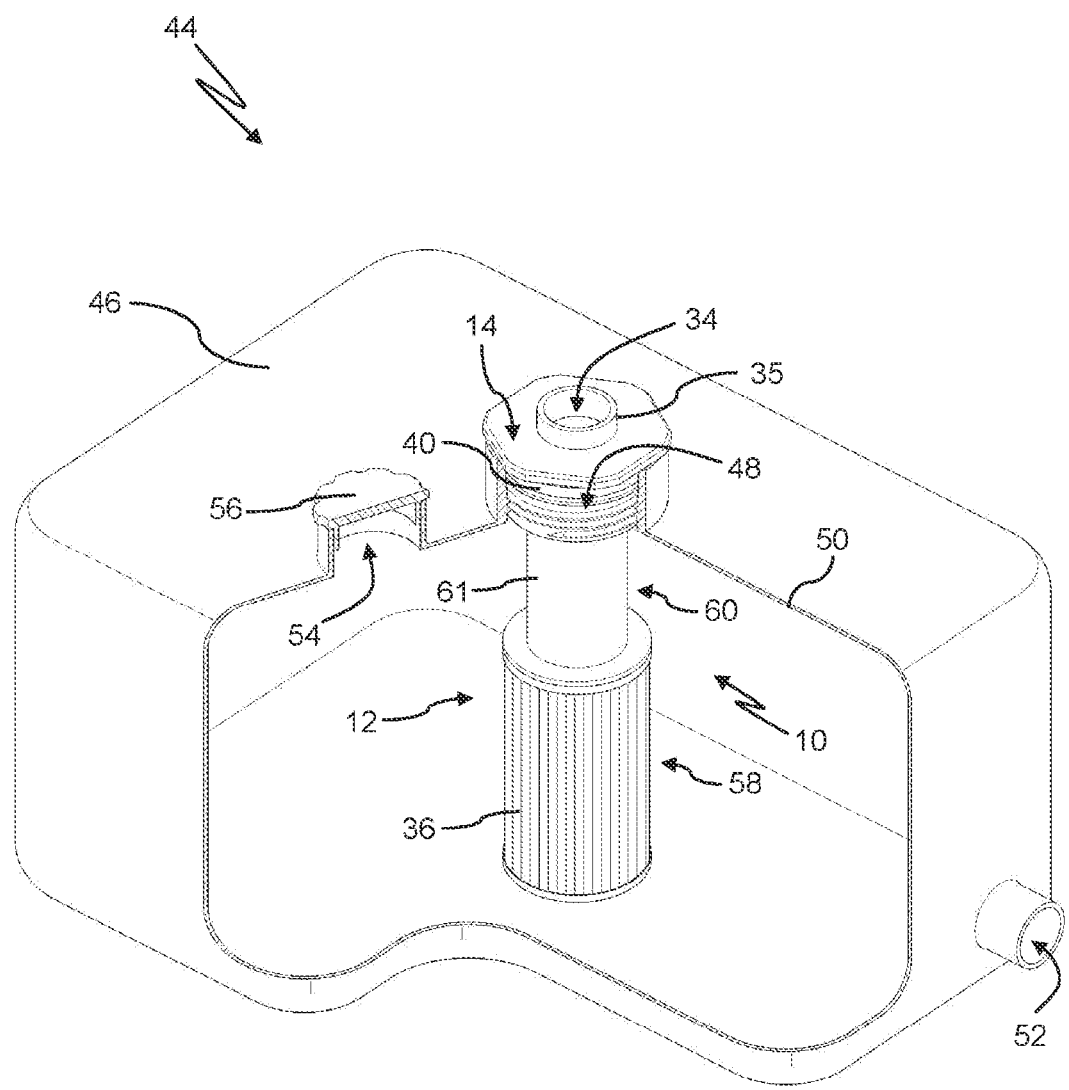
FIG. 4 shows the dryer cartridge of FIG. 3 screwed into an opening of a housing wall of a compensation tank, in a schematic perspective view with partially sectioned compensation tank.

FIG. 4 shows a drying system 44. The drying system 44 of FIG. 4 comprises the dryer cartridge 10 illustrated in FIG. 3. Moreover, the drying system 44 of FIG. 4 comprises a device for receiving the fluid that comprises a compensation tank 46. The device for receiving the fluid is embodied here as described in connection with FIG. 2. Thus, reference is being had to the above explanations.

In operation of the drying system 44, the fluid, not illustrated in detail, is located in the compensation tank 46. The fluid is here an electrically nonconducting insulating oil which is used for cooling the electrical device, here of the rechargeable battery. The fluid flows through the connection opening 34 into the compensation tank 46. In doing so, it flows through the drying agent in the receiving chamber 16 and through the filter medium 36. Through the outlet 52, the fluid is then conveyed again to the electrical device. A reverse flow through the drying system 44 is also possible here. For this purpose, in particular the bypass 62 of the dryer cartridge 10 is to be adapted to the changed flow direction.

In operation, a fluid level is adjusted in the compensation tank 46. The compensation tank 46 is typically approximately half, up to three fourths, filled with the fluid. By temperature-caused volume change of the fluid, a filling level of the fluid in the compensation tank 46 fluctuates in operation. Also, the loss or the refill of fluid leads to a change of the filling level in the compensation tank 46. The lengths of the flow-through region 58 of the wall 18 and of the wall section 60 that cannot be flowed through are selected such that, for a conventional filling level of the compensation tank 46, the fluid level is just above the boundary between the regions 58 and 60. The filter medium 36 is typically completely immersed in the fluid. Also, the part of the drying agent that is arranged at the level of the flow-through region 58 of the wall 18 is immersed in the fluid. A portion of the drying agent which is arranged close to the connection head 14 is located in a head space above the fluid.

What is claimed is:
1. A dryer cartridge for removal of water from a liquid, the dryer cartridge comprising:
 a cartridge body comprising:
  an axially elongated cartridge body wall, the cartridge body wall surrounding a receiving chamber therein;
  wherein the cartridge body wall is porous at a flow through region of the cartridge body wall, allowing the liquid to flow radially through the cartridge body wall into the receiving chamber;
 a drying agent arranged in the receiving chamber, the drying agent comprising:
  a first adsorber agent of a molecular sieve material; and
  a second adsorber agent different from the first adsorber agent;
  wherein the first adsorber agent and the second adsorber agent are arranged axially separated from each other in the receiving chamber;
 a connection head closing a first axial end of the cartridge body and configured to fasten the dryer cartridge in an opening of a housing wall of a device for receiving the liquid;
 wherein the connection head comprises
  a connection opening formed in the connection head and opening through the connection head from an exterior side of the connection head and into the receiving chamber,
  wherein the connection opening connects in fluid communication the receiving chamber to the exterior side of the connection head,
 wherein the cartridge body further includes:
  a filter medium arranged on an outer side of the cartridge body wall and radially surrounding the first and second adsorber agents.

2. The dryer cartridge according to claim 1, wherein the molecular sieve is a zeolite molecular sieve.

3. The dryer cartridge according to claim 1, wherein the cartridge body wall comprises
 at least one porous element selected from a mesh screen, a spunbond material, and a nonwoven.

4. The dryer cartridge according to claim 1, further comprising
 a separation element extending radially across an interior of the receiving chamber, arranged between and separating the first adsorber agent from the second adsorber agent.

5. The dryer cartridge according to claim 1, wherein the flow through region of the cartridge body wall comprises a mesh screen having flow through pores surrounding the receiving chamber; and
 wherein the filter medium is arranged on a radially outer side of the mesh screen.

6. The dryer cartridge according to claim 1, further comprising
 a bypass valve arranged on the cartridge body wall and positioned between the connection head and the drying agent, the bypass valve fluidically connecting an exterior side of the cartridge body wall to the connection opening of the connection head, the bypass valve configured to open when a differential pressure across the bypass valve exceeds a permissible pressure, the bypass valve opening to allow the liquid to bypass the drying agent of the dryer cartridge.

7. The dryer cartridge according to claim 3, wherein the cartridge body wall comprises
 pores with a pore size in a range between 1 μm and 5,000 μm.

8. The dryer cartridge according to claim 1, wherein:
 the first adsorber agent is arranged in a first drying agent bag; and
 the second adsorber agent is arranged in a second drying agent bag,
 wherein the first and second drying bags are arranged axially space apart from each other in the receiving chamber.

9. A drying system for removal of water from a liquid, the drying system comprising:
 a device for receiving the liquid having a housing wall;
 a dryer cartridge according to claim 1, wherein the dryer cartridge is fastened into an opening of the housing wall such that the first and second adsorber agents are arranged in an interior of the device for receiving the liquid.

10. The drying system according to claim 9, further comprising
a bypass valve arranged on the cartridge body wall and positioned between the connection head and the drying agent, the bypass valve fluidically connecting an exterior side of the cartridge body wall to the connection opening of the connection head, the bypass valve configured to open when a differential pressure across the bypass valve exceeds a permissible pressure, the bypass valve opening to allow the liquid to bypass the drying agent of the dryer cartridge.

11. The drying system according to claim 9, wherein the device for receiving the liquid contains the liquid and wherein the drying agent of the dryer cartridge is partially immersed in the liquid and partially is arranged in a head space above the liquid.

12. The drying system according to claim 9, wherein the device for receiving the liquid contains the liquid and wherein the liquid is a cooling agent or an electrically nonconducting cooling and/or insulating oil.

13. The drying system according to claim 9, wherein the electrically nonconducting cooling and/or insulating oil is an insulating oil containing a polyol ester oil and/or a poly-alpha-olefin.

14. The drying system according to claim 9, wherein the device for receiving the liquid comprises
a compensation tank and
wherein the dryer cartridge is fastened in the compensation tank.

15. The drying system according to claim 9, wherein the compensation tank is at least partially filled with the liquid.

16. The drying system according to claim 9, wherein the dryer cartridge is fastened in the opening of the housing wall of the device for receiving the liquid.

17. The drying system according to claim 16, wherein the dryer cartridge is screwed into the opening.

18. The drying system according to claim 9, wherein the device for receiving the liquid comprises
a transmission,
an electric motor,
a fuel cell,
a transformer, or
a rechargeable battery.

19. A method for drying a liquid, the method comprising:
providing a dryer cartridge according to claim 1;
passing the liquid through the connection opening of the connection head of the dryer cartridge.

20. A method for drying a liquid, the method comprising:
providing a drying system according to claim 9;
passing the liquid through the connection opening of the connection head of the dryer cartridge.

* * * * *